Feb. 21, 1967  G. M. SPENCE  3,305,613
HARDENING A CEMENT MIXTURE
Filed June 28, 1963
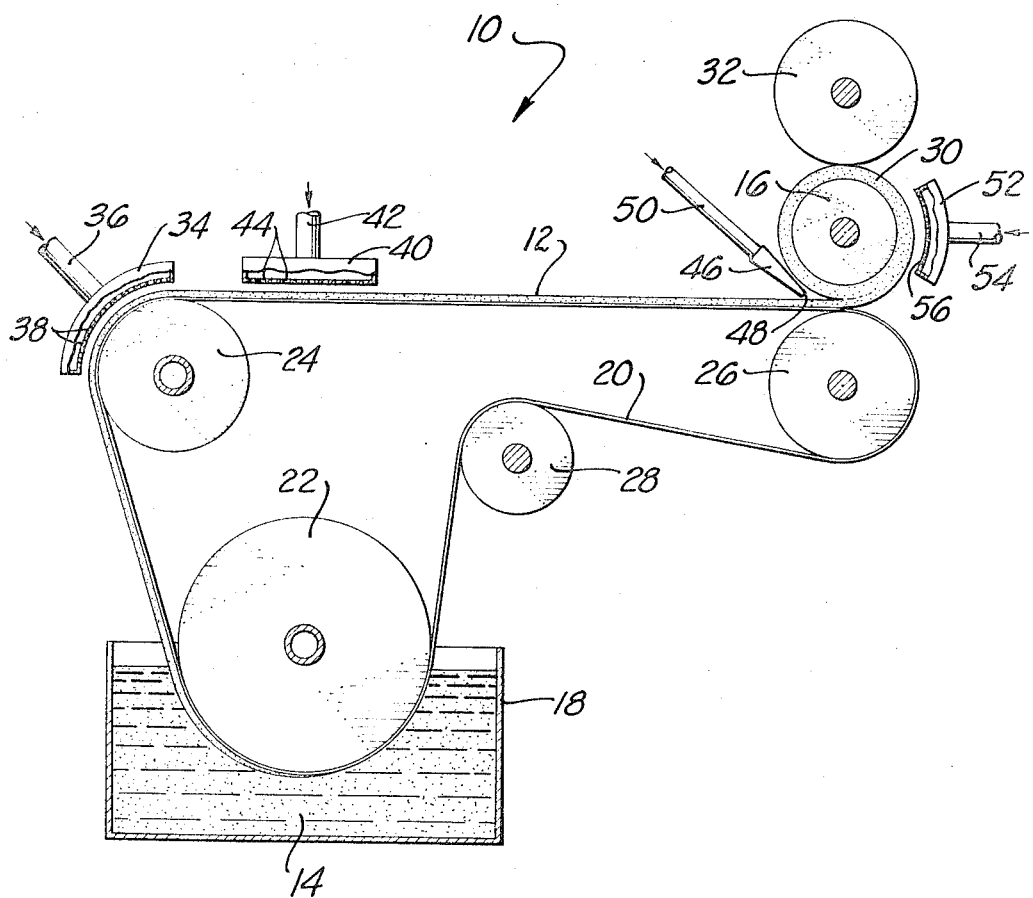
INVENTOR.
GERALD M. SPENCE
BY
EDWARD D. O'BRIAN
ATTORNEY 3,305,613
HARDENING A CEMENT MIXTURE
Gerald M. Spence, Tahachapi, Calif., assignor to Monolith Portland Cement Company, Los Angeles, Calif., a corporation of Nevada
Filed June 28, 1963, Ser. No. 291,351
4 Claims. (Cl. 264—82)

This invention relates to a new and improved method and apparatus for the hardening of cement mixtures. More specifically, it relates to the hardening of Portland cement mixtures which are used in the manufacture of products which are created in a desired shape upon an appropriate form on mandrel.

In the manufacture of so-called "cement" pipe it is conventional to form a mixture of slurry of Portland cement, asbestos and silica, to filter out the solids within such a slurry, and to apply such a solid mixture to an appropriate form or mandrel having the shape of the desired product. After a desired thickness of solids has been placed upon such a form or mandrel it is then normally processed so as to allow at least a significant amount of hydration to occur within the Portland cement present so as to make the article sufficiently rigid that is capable of being removed from the mandrel. Next, the final product is removed from the mandrel and the Portland cement is allowed to harden, either through normally occurring reactions or under the influence of steam and/or pressure, finishing the desired product except for various secondary type operations such as trimming and machining as required.

A number of different variations of the type of process broadly outlined in the preceding paragraph are, of course, known. Thus, for example, the ingredients within a slurry used in this type of process are frequently varied depending upon the desires of a manufacturer. In any process of this type there are several different significant economic considerations relating to the cost of carrying out the process.

One of these is the problem of "sag." Prior to the hydration of the cement compounds in a solids mixture encountered in this general type of process the mixture has a plastic consistency and character. As a consequence of this, if the solids located upon a mandrel are removed from the mandrel prior to a significant amount of "hardening" or hydration of the cement present these solids will not retain the shape of the mandrel, but will sag to varying extents depending upon a number of factors so as to assume other than the desired configurtion.

The amount of such sag can be controlled by allowing a cement containing solids mixture to remain on a mandrel in the indicated type of process until such time as the mixture hydrates and becomes sufficiently hard so that substantially no sag is encountered. Commercially it is desired to reduce the time such as mixture remains on the mandrel as short a time as possible because of the costs involved in having a plurality of mandrels holding products which are hydrating in a plant.

In order to lessen the time required for a cement containing product to harden upon a mandrel to a sufficient extent that such a produce can be removed without significant danger of deformation a number of different expedients have been suggested and used to varying extents. Thus, for example, it is known to partially cure such a mixture upon a mandrel through the use of steam or various other specialized gases. Such expedients are considered disadvantageous in a relative sense because of the fact that they primarily tend to affect the outer surfaces of the articles being created and do not provide a relatively uniform hardening within a comparatively short period throughout the thickness of an article.

An object of the present invention is to provide a new and improved method and apparatus for the hardening of cement mixtures in procedures of the general type indicated in the preceding discussion. Another object of this invention is to provide an apparatus as herein indicated which may be easily and conveniently constructed and used at a comparatively nominal cost. A further object of this invention is to provide a method which may be easily and conveniently carried out at a comparatively nominal cost, and which, if desired, may be used in conjunction with other known procedures for hardening a hydraulic cement containing product.

These and various other objects of this invention as well as many specific advantages of it will be more fully apparent from a detailed consideration of this specification, the appended claims and the accompanying drawing in which:

There is shown a schematic view of an apparatus of this invention.

Those skilled in the field pertaining to the hardening of cement mixtures will realize that the accompanying drawing is primarily intended to clearly illustrate for explanatory purposes a presently preferred apparatus of this invention, but that principles of this invention defined or summarized by the appended claims can be embodied within other differently constructed apparatus through the use of routine engineering skill or ability.

As an aid to understanding this invention, it can be indicated in essentially summary form that it concerns the application of carbon dioxide gas to a hydraulic cement mixture containing water as such a mixture is being moved or handled. So as to be located upon a form or mandrel. An apparatus of the present invention differs from prior apparatus for locating such as essentially solids mixture upon a form or mandrel by including means for applying carbon dioxide gas directly to such a mixture as it is being handled and/or located upon the form or mandrel.

The actual details of this invention can best be explained with reference to the accompanying drawing. Here there is shown an apparatus 10 of this invention which is used in obtaining a layer 12 of a hydraulic cement mixture containing water from a slurry 14 containing the solids within such a mixture and in locating this layer 12 upon the surface of a mandrel 16 having a desired cylindrical shape. The slurry 14 is normally contained within a slurry tank 18 which is contacted by means of a so-called "felt" 20 consisting of an endless belt of a porous material such as a common felt belt, a closely woven wire screen or the like. The felt 20 travels around a first vacuum roller 22 which extends into the slurry tank 18, around another vacuum roller 24 and a drive roller 26. It is normally maintained taut by at least one idler and take-up roller 28. All of these rollers 22, 24, 26 and 28 are of a conventional type, and hence are not shown in extreme detail in the accompanying drawing.

As the felt 20 is moved through the tank 18 around the roller 22 a vacuum is continuously applied to the interior or this roller 22. As this happens some of the slurry 14 is drawn against the felt 20 and is filtered by this felt so as to create a solids mixture forming the layer 12. As the felt is moved further water is withdrawn in the same general manner from the layer 12 by the vacuum roller 24 so that the layer 12 becomes a comparatively viscous, wet, paper-pulp-like mass which transfers to the mandrel 16 automatically as this mandrel contacts the layer 12 during the movement of the felt 20.

The mandrel 16 is preferably positioned immediately adjacent to the roller 32 in axial alignment to this roller so as to facilitate the winding of the layer 12 upon this mandrel. The mandrel 16 is, of course, rotated at the same speed at which the felt 20 is moved so as to avoid any "bunching up" of the layer 12 upon the mandrel 16. During this transfer operation the spacing of the mandrel 16 and the roller 32 tends to cause the layer 12 to be pressed into a desired final pipe-shaped body 30 upon this mandrel. If desired, a pressure roller 32 in axial alignment with the mandrel 16 may be rotated at the same speed as this mandrel in contact with the body 30 so as to aid in eliminating any voids or the like within this body.

In accordance with the present invention the apparatus 10 includes at least one means for applying carbon dioxide gas to the layer 12 as it is being handled in the manner indicated in the preceding discussion. One such means may consist of a manifold 34 located so as to be "wrapped around" and spaced adjacent to a part of the surface of the roller 24 so that the layer 12 completely passes under this manifold 34. The manifold 34 is supplied with carbon dioxide gas through a pipe 36 and distributes this gas through a plurality of small holes 38 directly onto the surface of the layer 12 as the apparatus is operated. During such operation the operation of the vacuum roller 24 will tend to draw the carbon dioxide gas distributed in this manner into the interior of the vacuum roller 24, causing this gas to effectively permeate the layer 12.

If desired, another means for applying carbon dioxide gas consisting of a manifold 40 extending across the layer 12 between the rollers 24 and 26 may be used. This manifold 40 is supplied with carbon dioxide gas through a pipe 42 and sprays this gas directly onto the layer 12 through holes 44.

Another means for applying carbon dioxide gas which is preferably used in a manifold 46 having a slot 48 extending substantially across the width of the layer 12. The slot 48 is located so as to be directed towards the line of contact of the mandrel 16 and the layer 12. This manifold 46 is supplied with carbon dioxide gas through a pipe 50, and distributes this gas directly onto the exposed surface of the layer 12 immediately prior to this layer being wrapped around the mandrel 16. It is also located so as to supply carbon dioxide gas to the outer surface of the various layers constituting the body 30 as this body is being formed.

A still further means of supplying gas to such layers consists of a manifold 52 which is closely located adjacent to the mandrel 16 so as to extend substantially the entire length of this mandrel around a part of its surface. This manifold 52 is supplied with carbon dioxide gas through a pipe 54 and distributes this gas through holes 56 directed generally toward the mandrel 16.

As the apparatus 10 is used in practising the present invention carbon dioxide gas is continuously placed upon the water containing hydraulic cement mixture being handled so as to become located upon the mandrel 16. This gas tends to react with compounds such as free lime (CaO) within this mixture so as to form precipitates such as calcium carbonate which give strength and a degree of solidity to the mixture. For some unknown reason the $CO_2$ gas "triggers" a hardening reaction within the cement gel as is noted by a sharp rise in temperature. This rise in temperature then it itself accelerates the hardening of the cement gel and causes the product to become quickly rigid. As a consequence of these factors, the body 30 created upon the mandrel 16 is of physically stronger character than if this gas is not used. This in turn enables the body 30 to be further processed and removed from the mandrel 16 at an earlier time than if the carbon dioxide gas was not utilized.

From an understanding of the preceding it will be apparent that the purity of the carbon dioxide gas utilized is substantially unimportant provided this gas does not contain impurities capable of inhibiting the hydration of cement compounds. Because of this it is possible to utilize common flu or stack gases in practising the present invention. In general, the amount of carbon dioxide gas used should be well in excess of the stoichiometric proportion of free lime present in the mixture treated with this gas in order to insure the formation of a precipitate from substantially all of this compound.

The present invention is considered to be particularly applicable to the manufacture of so-called "cement" pipe consisting of a mixture of conventional Portland cement and fine silica and asbestos fibers such as mixture consisting of 40–60% by weight any conventional Portland cement such as type I Portland cement, 25–35% by weight silica flour and 15–25% by weight asbestos fiber. With the use of this invention it is possible to obtain satisfactory products utilizing types of cement which have previoulsy not been employed in the general type of process herein explained because of the slowness at which such cement exhibit an initial set or hardness. The use of this invention also makes it possible to improve the economics of the production of cement articles by such means as lowering the number of rejects or seconds produced, by reducing the time for the production of said articles and by lessening the amount of equipment required to hold such articles as they are "stiffened" or becoming sufficiently hard so that they are capable of being removed from a form or mandrel without sagging.

It is to be particularly noted that the present invention concerns a localized application of carbon dioxide gas in such a manner that substantially the entire contents of body 30 formed on the mandrel 16 is thoroughly contacted by this gas so that the quantity of precipitate in this body is substantially uniform throughout its thickness. The manifold 34 is used in the apparatus 10 so that the gas is drawn completely through the layer 12, and the manifolds 46 and 52 are employed in such a manner that carbon dioxide is applied to both surfaces of the layer 12 formed into the body 30 upon the mandrel 16.

Because of the nature of this invention it is to be considered as being limited solely by the appended claims forming a part of this disclosure.

I claim:
1. In a process of manufacturing a Portland cement product in which a layer of a Portland cement mixture containing water is located upon a supporting surface and is transferred from said supporting surface to a form having a shape corresponding to the shape of said product, the improvement which comprises:
applying carbon dioxide gas to said mixture prior to the hydration of the cement in said mixture as said mixture is being handled so as to be located upon said form.

2. A process as defined in claim 1 wherein said layer has a surface directed toward said form and a surface directed away from said form, and carbon dioxide gas is applied to both surfaces.

3. A process as defined in claim 1 wherein said carbon dioxide gas is drawn completely through said layer.

4. A process as defined in claim 1 wherein said carbon dioxide gas is drawn completely through said layer and said layer has a surface directed toward said form and a surface directed away from said form, and carbon dioxide gas is applied to both surfaces of said layer.

References Cited by the Examiner

UNITED STATES PATENTS

| | | |
|---|---|---|
| 1,670,855 | 5/1928 | Herzog. |
| 2,004,703 | 6/1935 | Magnani. |
| 2,177,643 | 10/1939 | Ferla. |
| 2,671,939 | 3/1954 | Everhart et al. _____ 25—30 XR |
| 2,914,422 | 11/1959 | Pratt et al. _____ 117—63 XR |
| 2,944,291 | 7/1960 | Prior et al. _____ 264—82 |

ALEXANDER H. BRODMERKEL, *Primary Examiner.*

J. H. WOO, *Assistant Examiner.*